Patented Feb. 15, 1944

2,342,072

UNITED STATES PATENT OFFICE 2,342,072

HALOGENATION OF CYCLOPENTANE HYDROCARBONS

William A. Bailey, Jr., Berkeley, and Sumner H. McAllister, Lafayette, Calif., assignors to Shell Development Company, San Francisco, Calif., a corporation of Delaware No Drawing. Application March 4, 1940, Serial No. 322,166

9 Claims. (Cl. 260—648)

The present invention relates to halogenation, via substitution, and more particularly pertains to the efficient and controlled halogenation of cyclopentane and of organic compounds containing a cyclopentyl radical. In one of its specific embodiments the invention covers a novel process for the economic and efficient halogenation, such as chlorination, of cyclopentane or of organic compounds containing a cyclopentyl radical to produce large yields of the desired partially halogenated cyclopentane hydrocarbon, while avoiding or inhibiting the formation of undesirable by-products of the type of highly halogenated derivatives thereof.

Although the direct halogenation, via substitution, of various saturated aliphatic hydrocarbons, as well as some of the saturated cyclic compounds, has been known for some time, heretofore there were no known methods for the direct halogenation, such as chlorination or bromination, of cyclopentane, or of the organic compounds containing the cyclopentyl radical. [See: Ellis, "The Chemistry of Petroleum Derivatives," II, p. 763 (1937).] In fact, the chlorinated cyclopentanes produced heretofore were obtained indirectly by costly, cumbersome and uneconomic processes. For example, cyclopentyl chloride (monochlorocyclopentane) has been obtained by heating cyclopentanol for a period of several hours with concentrated hydrochloric acid under reflux conditions. Since cyclopentanol is a highly valuable product, being extensively used in the varnish industry, and because one of the purposes for the production of cyclopentyl chloride is to manufacture cyclopentanol therefrom, it is obvious that the above method of producing cyclopentyl halides is, at least, impractical. Also, some of the alkylated cyclopentyl halides were previously synthesized by highly indirect and cumbersome processes. For instance, Markownikow produced 1-chlor-1-methyl cyclopentane by first reacting methyl cyclopentane with nitric acid to form the tertiary nitro-compound, which was then treated with hydrogen to form the corresponding tertiary amino-compound; this, in turn, was reacted with nitrous acid (to yield the tertiary alcohol) and then with hydrochloric acid thereby finally forming the tertiary monochloride. Clearly, such complicated procedure cannot be profitably employed commercially for the manufacture of halogenated compounds.

It is the main object of the present invention to provide a simple and economic process for the direct halogenation of cyclopentane and of organic compounds containing a cyclopentyl radical. Another object is to provide a continuous process whereby the above-outlined and hereinbelow more fully described group of cyclic organic compounds may be efficiently subjected to direct halogenation via substitution, to produce high yields of partially halogenated compounds while at the same time avoiding, or at least greatly inhibiting side-reactions, such as the formation of highly halogenated cyclic compounds. A still further object of the invention is to provide a process whereby cyclopentane or alkylated cyclopentanes may be efficiently and continuously halogenated to produce high yields of monohalogenated derivatives of said cyclic hydrocarbons, without any substantial formation of poly-halogenated derivatives thereof.

It has now been discovered that the above and other objects may be attained by subjecting cyclopentane, or organic compounds containing a cyclopentyl radical, to the action of a halogen under certain operating conditions to be described more fully hereinbelow. It has also been discovered that the above-defined group of saturated cyclic organic compounds may be efficiently subjected to direct halogenation, via substitution, to obtain certain desired partially halogenated derivatives thereof, by subjecting the primary material to the direct action of a halogen under conditions whereby the material to be subjected to halogenation is employed in a large excess over the quantity necessary for reacting with the halogen introduced into the reaction zone, and whereby the product of halo-substitution is withdrawn from the reaction zone substantially as soon as formed.

Representative examples of saturated organic compounds which may be halogenated in accordance with the process of the present invention include cyclopentane, alkylated cyclopentanes, such as methyl cyclopentane, ethyl cyclopentane, 1,2-dimethyl cyclopentane, 1,3-dimethyl cyclopentane, cis-1-methyl-2-ethyl cyclopentane, trans-1-methyl-2-ethyl cyclopentane, 1-methyl-3-isopropyl cyclopentane, 1,2-dimethyl-3-isopropyl cyclopropane, and the like, and their homologues and analogues, and the partially halogenated derivatives of these and similar cyclic compounds containing a cyclopentyl radical, such as cyclopentyl chloride, cyclopentyl bromide, 1-chlor-1-methyl cyclopentane, 2-chlor-1-methyl cyclopentane, and the like, and their homologues and analogues.

In accordance with the process of the present invention, the halogenation may be controlled so as to produce high yields of a given and desired product of halo-substitution, while inhibiting the formation of undesirable highly halogenated derivatives thereof. Furthermore, in one of its specific embodiments, the present invention comprises a continuous process for the halogenation, via substitution, of the above-described cyclopentyl hydrocarbons, this process including the steps of continuously conveying halogen with a large excess of the primary cyclic material through the reaction zone to produce partially halo-substituted derivatives of the cyclic compound, and continuously withdrawing the reaction products from the reaction zone substantially as soon as formed, thereby preventing or at least markedly decreasing the formation of by-products, such as the highly halogenated cyclic compounds. This may be accomplished by continuously introducing a halogen together with a relatively large excess of the saturated cyclic compound of the described class, such as cyclopentane, into a reaction zone maintained under halo-substitution promoting conditions, and removing the product of halo-substitution, e. g., cyclopentyl halide, from such reaction zone substantially as soon as formed. As stated, in order to avoid or minimize the formation of highly halogenated compounds, the reaction must be effected in the presence of a large excess of the cyclic organic compound subjected to the treatment. In fact, it was found that the ratio of the primary material to the halogen should be at least about 3:1 and preferably as high as 10:1, or higher. For instance, as this will be more fully described in the examples presented hereinbelow, the yield of cyclopentyl chloride, other conditions being equal, increases from about 58.5% to 92.1% by increasing the cyclopentane-chlorine ratio (in the reaction zone) from about 2 to 4.5; while with a 7.3 ratio the yield was found to be about 97.4%, thus indicating that the yield of this monochloride of cyclopentane approaches 100% asymptotically at infinite ratio of cyclopentane to chlorine in the reaction zone.

In effecting the halo-substitution reaction in a continuous manner, use may be made of a rectifying column provided with a reaction zone, such column allowing the continuous and substantially immediate withdrawal of the reaction products from the reaction zone, thus avoiding or reducing undesirable side reactions. The use of such a rectifying column also permits rapid and even substantially immediate removal of the vaporous reactants and reaction products, and the return of the unused reagent or reagents back to the reaction zone, while restricting the halogenation reaction to that zone where optimum conditions of concentration and temperature are maintained. Also, by heating the reaction products leaving the reaction zone, it is possible to rectify them and return the unreacted fraction back into the reaction zone. It is clear that such a procedure prevents or materially decreases undesirable secondary reactions (such as the formation of highly halogenated cyclopentyl radical-containing compounds) both in the reaction zone and after withdrawal of the unreacted cyclopentane hydrocarbons and the desired partially halogenated derivatives thereof. Since the halo-substitution is to be effected with a large excess of the defined organic compound, the unreacted portion thereof, preferably after the removal of the hydrogen halide (which is formed as a by-product of the halo-substitution reaction), may be returned back into the aforementioned reaction zone for the purpose of commingling and reacting with additional quantities of halogen introduced thereinto. Such a process finds particular adaptability when the halo-substitution reaction is to be effected in a continuous manner.

Although, as was brought out above, the novel process constituting the main object of the present invention is applicable to the efficient halogenation, via substitution, of a relatively large group of organic saturated compounds containing a cyclopentyl radical, the process is particularly adapted to the halo-substitution of cyclopentane to produce high yields of cyclopentyl halides, while retarding or inhibiting the formation of poly-halide derivatives thereof. The cyclopentyl halides, such as cyclopentyl chloride, are highly valuable intermediates in the production of cyclopentanol which is extensively and industrially employed, for example, in the manufacture of varnishes. Therefore, as an example, the present invention will be described with particular reference to the chlorination of cyclopentane, it being understood, however, that these reactions are examples only, that the invention is broadly directed to the controlled halo-substitution of the defined group or class of cyclic organic compounds, and that, therefore, there is no intention of limiting the invention to any particular features described herein, the invention being coextensive in scope with the appended claims.

*Example I*

Cyclopentane was subjected to chlorination in an apparatus consisting of a glass packed column superimposed on a kettle provided with heating means. The upper end of the column communicated with a condenser for the liquefaction of the unreacted cyclopentane, and with means for returning this liquid as reflux back into the column. The chlorine was introduced gradually and slowly into the column at an intermediate point therein. During the chlorination reaction the unreacted cyclopentane vaporized in the kettle was refluxed rapidly and vigorously in order to maintain a large excess of the cyclopentane in contact with the chlorine in the column reaction zone. The products of chlor-substitution dropped down into the kettle, the temperature of which( although maintained above the boiling point of the cyclopentane, was below that of its products of chlorination. Thus, these products were removed from the reaction zone substantially immediately after their formation. The hydrogen chloride (formed by the reaction of one half of the chlorine with the hydrogen liberated by reason of the chlor-substitution reaction) was removed in a gaseous state from the reflux condenser. The chlorination was effected at about 50° C., the kettle temperature being somewhat higher so as to maintain a vapor-liquid phase in the reaction zone. The reaction was continued until the ratio of the chlorine introduced to the cyclopentane originally charged into the kettle was about 0.93 to 1.0. The composition of the reaction product was as follows:

| | Mole per cent |
|---|---|
| Unreacted cyclopentane | 13.4 |
| Cyclopentyl chloride | 80.2 |
| Cyclic polychlorides | 6.4 |

The yield of the cyclopentyl chloride, based on the reacted cyclopentane, was thus 92.7 mole per cent.

As noted above, in order to obtain substantially quantitative conversion of the cyclopentane or of the organic compounds containing the cyclopentyl radical to the desired mono-halides, while avoiding the formation of the corresponding halides, it is necessary to effect the reaction above the boiling point of the primary material, but below the temperature at which the monohalogenated derivative thereof boils. It was also found that, when the chlor-substitution is effected in accordance with the process of the present invention, whether in a batch or continuous manner, the conversion of the primary material, other conditions being equal, increases as the operating temperature approaches the boiling point of the desired chlor-substituted derivative of the hydrocarbon subjected to this treatment. However, since it is desired to withdraw the reaction product from the reaction zone substantially as soon as such product is formed, the reaction temperature must be below its boiling point so that the liquid formed can be thus immediately withdrawn from the sphere of reaction.

*Example II*

Several runs were effected in which cyclopentane was chlorinated, via substitution, in a continuous manner. For this purpose an apparatus comprising a heated kettle superimposed by a packed reaction column was employed. The chlorine was continuously fed into an intermediate point in the column, while fresh cyclopentane was introduced substantially at the top thereof. The kettle temperature was maintained at about 114° C., which is just below the boiling point of cyclopentyl chloride. The temperature of the column was below 114° C., but above that at which cyclopentane condenses. The unreacted cyclopentane vapors were withdrawn from the top of the reaction column, condensed, separated from the hydrogen chloride, and returned together with fresh or make-up cyclopentane, thereby maintaining the cyclopentane-chlorine ratio in the reaction column constant. Since the kettle temperature, and therefore the temperature in the reaction column, was below the boiling point of cyclopentyl chloride, the organic reaction products dropped into the kettle substantially as soon as formed. This decreased the formation of undesirable cyclic polychlorides. By varying the rate of refluxing of the cyclopentane, the mole ratio of cyclopentane to chlorine in the reaction column was varied from run to run. The results obtained, and the effect of high cyclopentane-chlorine ratios in the reaction zone are shown in the following table:

| Mole ratio of cyclopentane to chlorine in reaction zone | Per cent chlorine unreacted | Analysis of product in mole per cent | | | Yield of cyclopentyl chloride, mole per cent |
|---|---|---|---|---|---|
| | | Cyclopentane | Polychlorides | Cyclopentyl chloride | |
| 2.1:1 | 0.48 | 1.6 | 45.4 | 53.0 | 53.9 |
| 2.9:1 | 0.25 | 2.1 | 12.9 | 85.0 | 86.9 |
| 4.6:1 | 0.08 | 1.7 | 7.1 | 91.1 | 92.8 |
| 7.3:1 | 0.08 | 1.5 | 3.5 | 95.0 | 96.4 |
| 10.0:1 | 0.00 | 0.9 | 2.8 | 96.3 | 97.2 |

From the above it is seen that the yield of the desired cyclopentyl monochloride increases with an increase in the mole ratio of the refluxed cyclopentane to the chlorine fed into the reaction column. Although the cyclopentyl chloride yield is very high (97.2 mole per cent) with a ratio of about 10:1, the above data shows that satisfactory yields are produced with ratios of from about 3:1 to 7:1. Furthermore, such increase in the ratio, besides decreasing the percentage of the unreacted chlorine and the percentage of the unreacted cyclopentane, greatly decreased the yield of undesirable polychlorides. Thus, by increasing the ratio from about 2:1 to 10:1, the mole per cent of the heavy ends decreased from about 45.4 to 2.8 mole per cent.

*Example III*

Cyclopentane was subjected to the action of chlorine in the same manner and in the same apparatus as employed for the series of runs described in Example II. The reflux ratio of cyclopentane to chlorine in the reaction column was maintained at about 4.5:1. During the chlor-substitution reaction, the kettle was heated to a temperature of about 120° C., which is above the boiling point of cyclopentyl monochloride, so that its vapors were thus present in the reaction zone. An analysis of the reaction production collected in the kettle showed that the yield of cyclopentyl chloride was 83.4 mole per cent. Also, on the basis of the chlorine content, the reaction product contained about 16.5 mole per cent of polychlorinated cyclopentanes. When compared with the corresponding run described in Example II (in which the kettle temperature was below the boiling point of the monochloride and in which the ratio was about 4.5:1), it is seen that when the reaction is effected at a temperature above the cyclopentyl chloride boiling point, the yield of undesirable polychlorides increases with a corresponding decrease in the yield of the cyclopentyl monochloride.

*Example IV*

A hydrocarbon fraction predominating in methyl cyclopentane was subjected to continuous chlorination with a reflux ratio of about 3.3 to 1. The kettle temperature was maintained somewhat below the boiling point of the lowest boiling methyl cyclopentane monochloride isomer. An analysis of the effluent gases and of the reaction product collected in the kettle indicated that about 98% of the fraction was chlorinated, with a yield of monochlorides equal to about 75%. This relatively low yield was due to the low hydrocarbon-chlorine reflux ratio employed in the reaction zone. Very little if any primary and tertiary monochlorides were obtained, the reaction product containing at least three isomeric monochlorides predominantly of secondary character. Greater yields of the monochlorides were obtained when the above reaction was effected with higher methyl-cyclopentane-chlorine ratios in the reaction zone.

The heating of the kettle in which the liquid reaction products accumulate, besides providing the heat necessary for the maintenance of the primary material in a vapor phase in the reaction zone, also rectifies the reaction products by vaporizing therefrom any unreacted cyclic material which may be entrained or otherwise carried into the kettle by the halogenated reaction products. Such a procedure is advantageous in that it eliminates the necessity of a separate subsequent treatment of the reaction product for the separation of such unreacted cyclic organic compounds. Also, it results in a substantially quantitative conversion of the primary material.

As shown, the temperature in the reaction zone may be maintained somewhat above the boiling point of the organic reactant. This allows a liquid-vapor phase in the reaction zone. It is possible to operate at any reaction temperature above the boiling point of the cyclic organic compound subjected to halo-substitution, provided that the temperature is below the boiling point of the halo-substituted derivatives thereof. This allows the liquefaction of such halides and their substantially immediate removal from the reaction zone. However, the highest yields were obtained when the reactions were effected all temperatures above but relatively near the boiling point of the organic reactant, so that a mixed phase was maintained in the reaction zone.

The above-described halo-substitution reactions require the use of light which has an activating influence on the halogenation reaction. In fact, it was found that there is substantially no hydrogen halide in the effluent gases if the reaction is attempted in total darkness. For instance, when cyclopentane was subjected to the action of chlorine according to the method employed in Example I, there was substantially no chlorination observed even at the end of four minutes when the reaction was attempted in total darkness. On the other hand, with the top of the column subjected to the influence of diffused light, the reaction started almost at once and reached a stage of complete chlorine reaction or consumption in less than two minutes. It is to be further noted that in accordance with the present invention, the light need not penetrate into the reaction zone itself, but may be disposed at any point above thereof. In other words, as long as the reaction chain mechanism may be initiated (by the influence of light) at any point above the reaction zone, this chain mechanism will propagate and cause the desired halo-substitution in the reaction zone. The halo-substitution reaction will reach its maximum in a shorter period of time if the light is directed at the reaction zone. However, once initiated, the halo-substitution will be the same so that the same high yields will be produced.

Although the above-described examples were specifically directed to the chlorination of cyclopentane and of methyl cyclopentane, the process of the invention is equally applicable to the halogenation, such as chlorination, bromination or iodination, of these and other organic compounds containing a cyclopentyl radical. Furthermore, it was stated above that, when effecting the reaction in accordance with the preferred embodiment of the present invention, it is possible to obtain the mono-halogenated derivatives of the afore-mentioned class of organic compounds containing the cyclopentyl radical, to the substantial exclusion of the polyhalogenated derivatives thereof. It is to be noted, however, that some of these polyhalides are quite valuable. For instance, the 1,2- and 1,3-dichlorides of cyclopentane may be employed as intermediates in the production of resins. When such polyhalides are desired, the above-described reaction may be effected at temperatures which are above the boiling point of the respective monohalide, thereby allowing the vapors of such monohalides to remain in the reaction zone and to come in contact with additional quantities of the halogen. This will result in their further halogenation so that the final reaction product will contain a considerably higher percentage of the desired polyhalide. The degree of poly-halogenation may thus be controlled by regulating the reaction temperature.

The process of the invention may be effected at atmospheric pressures, as well as at pressures which are somewhat below or above atmospheric. The total pressure in the reaction zone may be regulated to some extent by the temperature of the reflux condenser, which temperature can be fluctuated by an increase or decrease in the amount of cooling medium. In this way the pressure most suitable for the particular halogenation reaction may be maintained; the partial pressures of the cyclic compound and the halogen may be regulated to a certain extent by the introduction of smaller or larger quantities of the reagents, and by more or less refluxing of the cyclopentane or the like; this gives the present process great operating flexibility.

When effecting the chlor-substitution reaction in accordance with the preferred embodiment of the invention, it is possible, contrary to all the available information, to halogenate the aliphatic cyclic organic compounds of the described class to produce high conversions, e. g., in the neighborhood of 90% to 95% or above, to the corresponding monohalogenated derivatives of such organic compounds, while, at the same time, substantially inhibiting the formation of the corresponding polyhalides.

We claim as our invention:

1. A continuous process for producing cyclopentyl chloride which comprises continuously introducing cyclopentane in a liquid state and chlorine into a rectifying column having a reaction zone, maintaining a high ratio of cyclopentane to chlorine in the reaction zone, maintaining the temperature above the boiling point of cyclopentane but below that at which cyclopentyl chloride boils, thereby causing said cyclopentane to move toward the top of the column in a vaporous state and the cyclopentyl chloride to move toward the bottom in a liquid state, and removing said cyclopentyl chloride from the reaction zone substantially as soon as formed, thereby inhibiting the formation of polychlorinated derivatives thereof.

2. The process of claim 1 wherein the unreacted cyclopentane rising as a vapor to the top of the rectifying column is withdrawn therefrom and, after removal of the hydrogen chloride formed as a by-product of the chlor-substitution reaction, is returned continuously into the reaction zone for further chlor-substitution with new quantities of chlorine introduced thereinto.

3. The process of claim 1 wherein the cyclopentane-chlorine molar ratio in the reaction zone is maintained above 3:1.

4. A process for producing cyclopentyl chloride which comprises directly contacting cyclopentane with chlorine at a temperature above the boiling point of the cyclopentane but below that at which cyclopentyl chloride boils, maintaining a high cyclopentane-chlorine ratio in the reaction zone, and removing the cyclopentyl chloride from the reaction zone substantially as soon as formed, thereby inhibiting the formation of cyclopentyl polychlorides.

5. The process of claim 4 wherein the cyclopentane-chlorine molar ratio is maintained above 3:1.

6. A process for the production of cyclopentyl halides in a continuous manner in a rectifying column provided with a reaction zone which comprises continuously introducing cyclopentane in a liquid state into said reaction zone, simultaneously introducing into said reaction zone a halogen selected from the group consisting of chlorine, bromine and iodine, maintaining a high ratio of cyclopentane to halogen in said zone, regulating the operating conditions in the reaction zone so as to cause the vaporization of the cyclopentane and its movement toward the top of the column and the movement of the halo-substituted products toward the bottom of the column in the liquid state, and removing the halo-substituted cyclopentane from the reaction zone substantially as soon as formed, thereby inhibiting the formation of highly halogenated derivatives.

7. The process of claim 6 wherein the mole ratio of cyclopentane to halogen in the reaction zone is maintained above 3:1 and wherein the unreacted cyclopentane vapors reaching the top of the column are liquefied and returned back into the reaction column for commingling and reaction with additional quantities of the halogen continuously introduced into the reaction zone.

8. A process for the production of cyclopentyl halides which comprises contacting cyclopentane with a halogen selected from the group consisting of chlorine, bromine and iodine, effecting the reaction in the presence of a large excess of cyclopentane and at a temperature between the boiling points of the cyclopentane and the desired halo-substituted derivatives thereof, and removing the cyclopentyl halide from the sphere of reaction substantially as soon as formed, thereby inhibiting the formation of highly substituted cyclopentyl derivatives.

9. A process for the production of organic halides, which comprises contacting halogen selected from the group consisting of chlorine, bromine and iodine with a saturated organic compound containing a cyclopentyl radical, maintaining a high organic compound to halogen mole ratio, effecting the reaction at a temperature below that at which the organic reaction products boil but above the boiling point of the organic reactant, and removing the halo-substituted reaction product from the sphere of reaction substantially as soon as formed.

WILLIAM A. BAILEY, Jr.
SUMNER H. McALLISTER.